(12) United States Patent
Flowers

(10) Patent No.: US 11,774,334 B1
(45) Date of Patent: Oct. 3, 2023

(54) GAS FITTING PRESSURE TEST DEVICE

(71) Applicant: Christopher Thomas Flowers, Ronald, WA (US)

(72) Inventor: Christopher Thomas Flowers, Ronald, WA (US)

( * ) Notice: Subject to any disclaimer, the term of this patent is extended or adjusted under 35 U.S.C. 154(b) by 95 days.

(21) Appl. No.: 17/409,651

(22) Filed: Aug. 23, 2021

Related U.S. Application Data

(60) Provisional application No. 63/068,970, filed on Aug. 21, 2020.

(51) Int. Cl.
*G01N 3/12* (2006.01)
*G01N 3/04* (2006.01)

(52) U.S. Cl.
CPC .............. *G01N 3/12* (2013.01); *G01N 3/04* (2013.01); *G01N 2203/0274* (2013.01)

(58) Field of Classification Search
CPC .......... G01N 35/00; G01N 25/18; G01N 7/00; G01N 1/2226; G01N 3/02; G01N 31/223; G01N 3/12; G01N 15/0826; G01N 30/6026; G01N 27/4062; G01N 15/0806; G01N 3/04; G01N 2203/0274; G01M 3/12; G01M 3/229; G01M 3/205; G01M 3/02; G01M 3/329; G01M 3/2861; G01M 3/225; G01M 3/227; G01M 3/2869; G01M 3/26; G01M 3/28
See application file for complete search history.

(56) References Cited

U.S. PATENT DOCUMENTS

2021/0156776 A1* 5/2021 Smalley .................. G01N 3/12

FOREIGN PATENT DOCUMENTS

CN             213336651 U   *   6/2021

* cited by examiner

*Primary Examiner* — Brandi N Hopkins
(74) *Attorney, Agent, or Firm* — Dwayne E Rogge; Puget Sound Patents

(57) ABSTRACT

Disclosed herein is a gas fitting pressure test device in one example having a test plate with a first side configured to seal to a gas fitting. The gas fitting having a surface defining a void therein. The test device also having a gas conduit through the first side of the test plate, the gas conduit configured to be in fluid communication with an inner void of the gas fitting. The test device also having an electromagnet adjacent the second side of the test plate, configured to provide magnetic force on the gas fitting greater than the force exerted on the gas fitting. The test device having or connected to a source of positive gas pressure in fluid communication with the gas conduit.

9 Claims, 4 Drawing Sheets

GAS FITTING PRESSURE TEST DEVICE

RELATED APPLICATIONS

This application claims priority of U.S. Provisional Patent Application Ser. No. 63/068,970 filed on Aug. 21, 2020, incorporated herein by reference.

BACKGROUND OF THE DISCLOSURE

Field of the Disclosure

This disclosure relates to the field of testing equipment for gas fittings under positive pressure.

BRIEF SUMMARY OF THE DISCLOSURE

Disclosed herein is a gas fitting pressure test device comprising: a test plate having a first side configured to seal to a gas fitting having a surface defining a void therein; the test plate having a second side opposing the first side; a gas conduit through the first side of the test plate, the gas conduit configured to be in fluid communication with the void of the gas fitting; an electromagnet adjacent the second side of the test plate; the electromagnet configured to provide magnetic force on the gas fitting greater than the force exerted on the gas fitting and a source of positive gas pressure in fluid communication with the gas conduit.

The gas fitting pressure test device may be arranged wherein the test plate further comprises a malleable pad (such as a rubber plate) on the first side of the test plate.

These gas fittings may be caps for capping off oil lines etc. Such as for example permanently or temporarily severed gas lines. These gas lines may be ¾" or smaller in outer diameter and may be 64" or larger in outer diameter.

It may be desired that these gas fittings be pre-tested to ensure that they can withstand the gas pressures of the pipes or other structures they are connected to prior to installation. Particularly when the gas fittings are welded or brazed onto the pipes/conduits/structures and removal/replacement is more difficult than with a screw-on fitting, pre-testing is important.

In some applications, a simple and efficient method and apparatus to pre-test such gas fittings is needed. In one example, a method and apparatus to re-test such fittings using positive gas pressure, rather than negative gas pressure.

The gas fitting pressure test device may further comprise a gas valve between the source of positive pressure and the test plate.

The gas fitting pressure test device may be arranged, wherein the gas fitting is ferrous. The gas fitting pressure test device may be arranged, wherein the gas fitting is steel. The gas fitting pressure test device as recited in claim 1, wherein the gas fitting is a gas conduit cap (gas cap).

The gas fitting pressure test device may be arranged, wherein the gas fitting is configured to be welded onto a gas pipe.

The gas fitting pressure test device may be arranged wherein the first side of the test plate is substantially planar.

The gas fitting pressure test device may be arranged wherein the first side of the test plate comprises a malleable layer configured to decrease pressure leakage from the void of the gas fitting.

DETAILED DESCRIPTION OF THE DISCLOSURE

Figure 1:
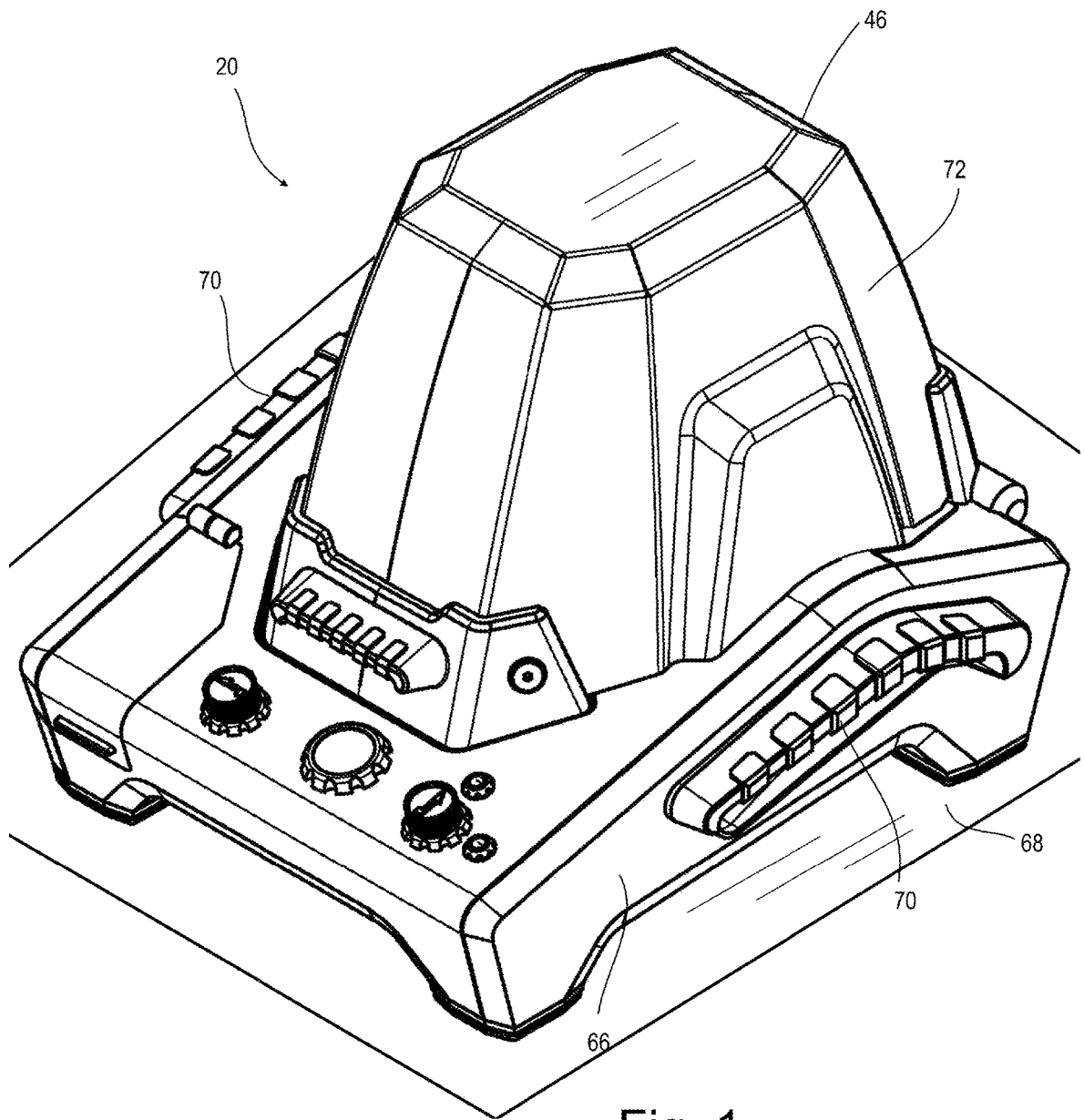
FIG. 1 is a perspective view of one example of the disclosed gas fitting pressure test device.

In the field of gas supply lines, it is often desired to install fittings such as gas termination caps, valves, reducers, expanders, Y-fittings, etc. onto pipes and other gas conduits for various reasons. For example, when a home or other structure is damaged by fire or other disaster the natural gas supply line may be capped to ensure that natural gas does not leak out of the gas supply line.

The term "gas" as used herein to encompass a state of matter that is not solid. The term is intended to include substances possessing molecular mobility and the property of indefinite expansion, as opposed to a solid or liquid as well as any such fluid or mixture of fluids.

It is often desired to test these fittings prior to attachment. Where it is often difficult, expensive, and time consuming to install such gas fittings, it would be unfortunate for a gas fitting to fail, leaking gas into the environment and very potentially creating a hazard. Thus, the apparatus disclosed herein has been designed to test such gas fittings prior to installation.

To test such a fitting, prior art testing devices and methods have been found insufficient either by using a negative pressure in the gas fitting, or by requiring threaded attachment, mechanical clamping, or other time consuming attachment of the gas fitting to the testing device. A gas fitting pressure test method and device is disclosed herein to quickly, safely, and easily test such gas fittings with positive pressure without mechanical clamping, threaded surface on the gas fitting, etc. The apparatus and methods disclosed herein accomplish this without welding, threading, adhering, nor other sealing methods which may leave a residue on the gas fitting after testing.

Disclosed herein is a gas fitting pressure test device 20 with examples shown to describe the general components and methods to operate the test device 20. The test device 20 in one example comprises a test plate 22 having a first side 24 onto which is placed the gas fitting 28 to be tested, and an opposing second side 26. The first side 24 of the test plate 22 is configured to seal to the gas fitting 28 during testing to maintain a positive pressure therein. Such gas fittings may be for example, a termination cap for a gas line, valve, conduit, conduit connector, etc.

Figure 11:
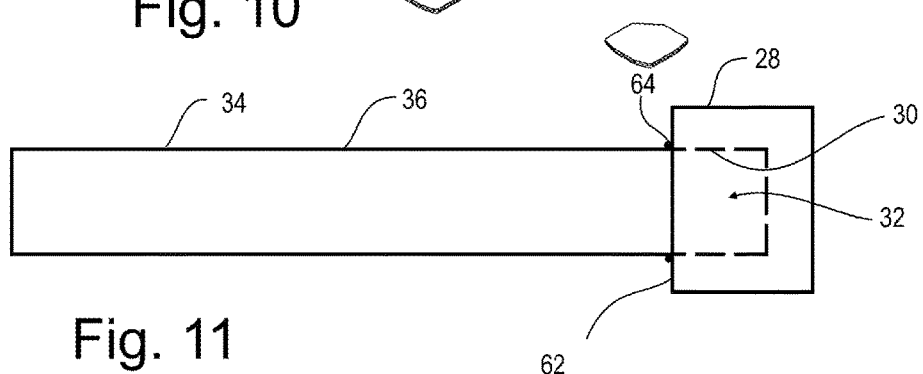
FIG. 11 is a hidden line view of a gas fitting attached to a pipe.

The gas fitting 28 disclosed herein has a surface 30 defining a void 32 therein. For example, as shown in FIG. 11 where the gas fitting 28 is configured to be attached and sealed to another fitting, such as the pipe 34, this surface 30 may be adjacent the outer surface 36 and sealed thereto to prohibit the passage of gas under positive pressure between the pipe 34 and the fitting 28. When attached to the test plate 22, to provide gas under positive pressure to this void 32, a gas conduit 38 may be provided through the first side of the test plate 22 with an opening 40 thereon. The gas conduit 38 is thus open to the void 32 when the gas fitting 28 is in place on the test plate 22 during testing in that the open edge of the void 32 surrounds the opening 40. This will be explained in more detail.

Thus, as gas is provided under positive pressure through the conduit 38, the amount of gas (moles) increases, the volume remains the same, the temperature does not change, and thus the pressure inside the void 32 must increase.

In one example, the void 32 may be a partial void, in such an example the test plate 22 encloses the void save the opening 40.

The gas conduit 38 is configured to be in fluid communication with the void 32 of the gas fitting 28 when the gas fitting 28 is placed on the test plate 22 and secured thereto as will be explained. When properly placed, the gas fitting is placed over the opening 40 such that the opening 40 is in fluid communication with the void 32. Thus, gas provided under positive (greater than 1 atm) pressure to the void 32 will bias the gas fitting 28 outward and thus away from the test plate 22 barring some offsetting force. With an offsetting force, the pressurized gas/increase in mass of the gas entering the void 32 will pressurize gas within the void 32. When such pressure is applied, and measured at a pressure sensor 92 any cracks, holes, or other defects in the gas fitting 28 which would result in a pressure loss can be detected as a decrease in pressure at the pressure sensor 92.

To offset the force of the pressurized gas in the void 32, an electromagnet 42 may be positioned adjacent the second side 26 of the test plate 22. The electromagnet 42 is configured to provide magnetic force on the magnetic or ferrous gas fitting 28 or other magnetic or ferrous object greater than the gas pressure force exerted on the gas fitting 28 during testing. The gas pressure biasing the gas fitting 28 away from the test plate 22 the magnetic force biasing the gas fitting 28 toward the test plate 22 with greater pressure. The net force holding the gas fitting 28 against the test plate 22 with sufficient force to eliminate leakage between the gas fitting 28 and the test plate 22.

The magnitude of the electromagnet force exerted by the electromagnet 43 can be calculated by using the dimensions and other properties of the magnet based into a simple equation: F=(n×i)2×magnetic constant×a/(2×g2). Where, F=force, i=current, g=length of the gap between the electromagnet and a piece of ferrous metal (e.g., the gas fitting), a=Area, n=number of turns of wire in the electromagnetic coil 43 of the electromagnet 42, and the magnetic constant=4×PI×10-7.

Passing an electrical current through the coil 43 of the electromagnet 42 results in a magnetic field that exerts force on nearby ferromagnetic objects, such as pieces of iron or steel including the gas fitting 28. The net force holding the gas fitting 28 against the test plate 22 with sufficient force to eliminate leakage between the gas fitting 28 and the test plate 22.

The magnetic and electric forces on a charged item is called the Lorentz force represented by the equation:

$$F=(n\times i)^2 \times \text{magnetic constant} \times a/(2\times g^2)$$

The force exerted on the gas fitting is calculated with the formula:

$$F=P*A$$

where P is the gas (air) pressure and A is the area of the surface of the void 32 resulting in force away from the test plate 22.

This gas pressure is provided by a positive gas pressure source 44 in fluid communication with the conduit 38 and thus in turn to the opening 40. This gas pressure source 44 may be a gas (air) pump, gas (air) compressor, gas filled canister such as known for the carrying and use of propane, compressed air, etc., or other structure configured to provide gas (air) under pressure to the gas conduit 38.

Figure 6:
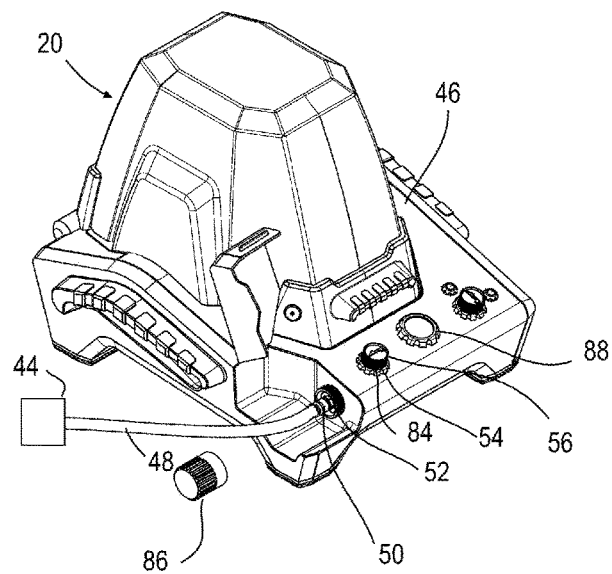
FIG. 6 shows the device of FIG. 4 connected via a gas conduit to a source of positive gas pressure.

In the example shown in FIG. 6, the gas pressure source 44 is external of and removably coupled to the housing 46 of the test device 20 via a gas conduit (tube) 48. For ease in connection and removal, the gas conduit 48 may comprise a quick disconnect fitting 50 configured to be easily and removably coupled to a cooperating quick disconnect fitting 52 on the housing 46. The source 44 of gas pressure may alternatively be a dedicated source attached to or within the housing 46.

Figure 10:
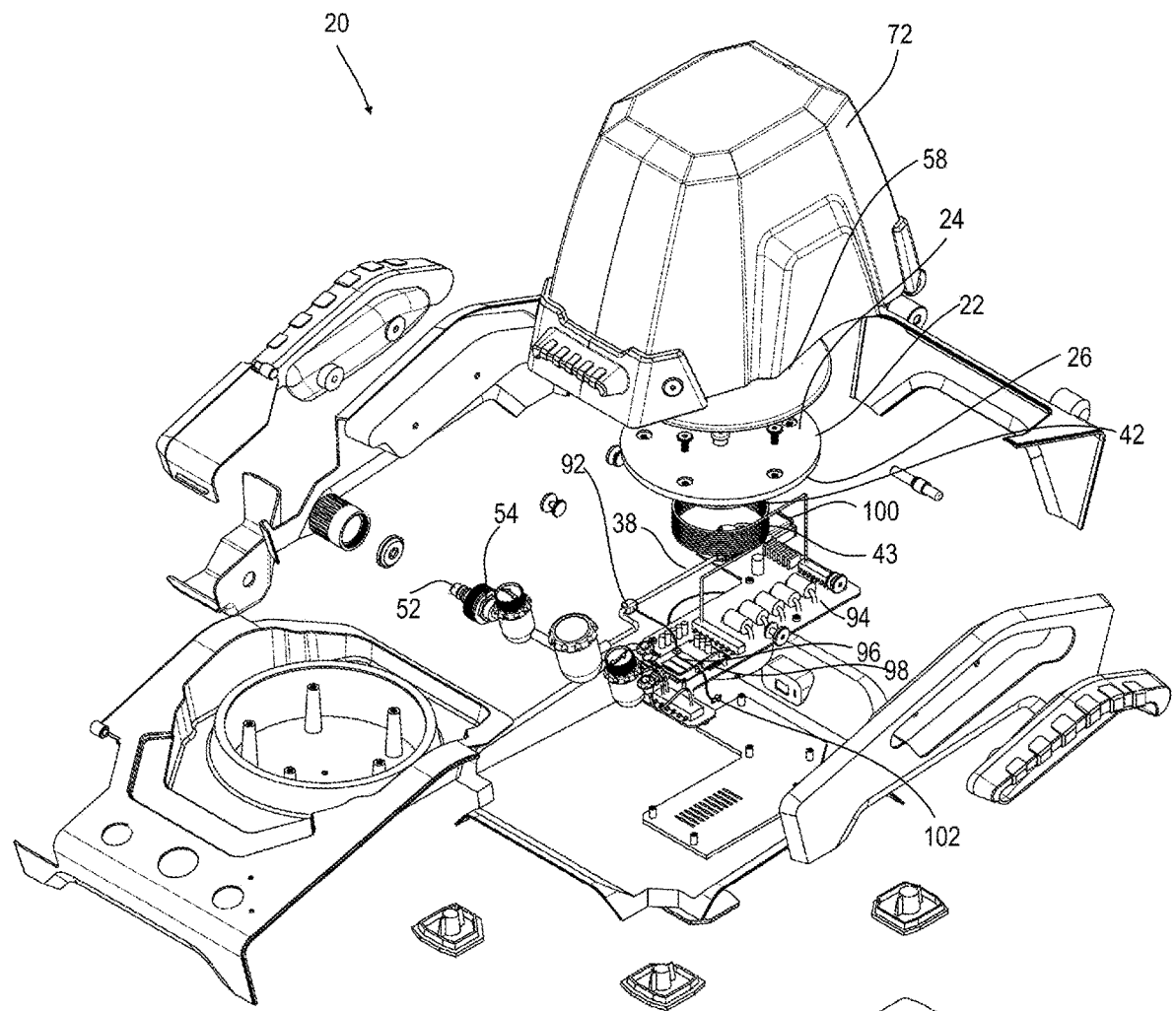
FIG. 10 is an exploded view of the device of FIG. 1.

In one example, a gas valve 54 may be provided in fluid communication with and positioned between the gas pressure source 44 and the test plate 22 as shown in FIG. 10. This position allows the test plate 22 to be isolated from the gas pressure source 44 during testing. For example, the gas fitting 28 may be pressurized, and the valve 54 then closed to reduce back-pressure on the gas pressure source 44 and reduce likelihood of leakage in conduits between the valve 54 and the gas pressure source 44 resulting in a false failure data recording.

In one example the test plate 22 is substantially planar (flat) To enhance the seal between the test plate 22 and the gas fitting 22, the gas fitting pressure test device 20 may be arranged wherein the test plate 22 further comprises a malleable pad 5 (such as a rubber pad, silicone pad, etc.), or in other examples may include vacuum grease, oil, or other viscous or semi-viscous fluid on the first side 24 of the test plate 22. In FIG. 11, it can be seen that the gas fitting 28 comprises an end surface 62 adjacent the pipe 34. This surface 62 maybe welded 64 to the pipe 34 and may not be perfectly flat. Thus, the malleable pad 58 provides a compressible seal when the gas fitting 28 is pulled toward the test plate 22 by the electromagnet 42. When gas under pressure is provided to the void 32, the malleable pad 58 prohibits gas leakage through any gaps between the test plate 22 and the gas fitting 28.

The gas fitting pressure test device may be arranged, wherein the gas fitting 28 is ferrous, partially ferrous, or a ferrous component is added to interact with the electromagnet 42. The gas fitting pressure test device may be arranged, wherein the gas fitting is steel. The gas fitting pressure test device as recited in claim 1, wherein the gas fitting is a gas conduit termination cap (gas cap).

A series of operations for use of the gas fitting pressure test device 20 are shown in FIG. 1-FIG. 9. In FIG. 1 the housing 46 is placed with it's base 66 resting on a support surface 68 such as a table, countertop, workbench, cart, etc. The housing 46 may include lifting handles 70 to allow a user to easily lift the device 20.

Figure 2:
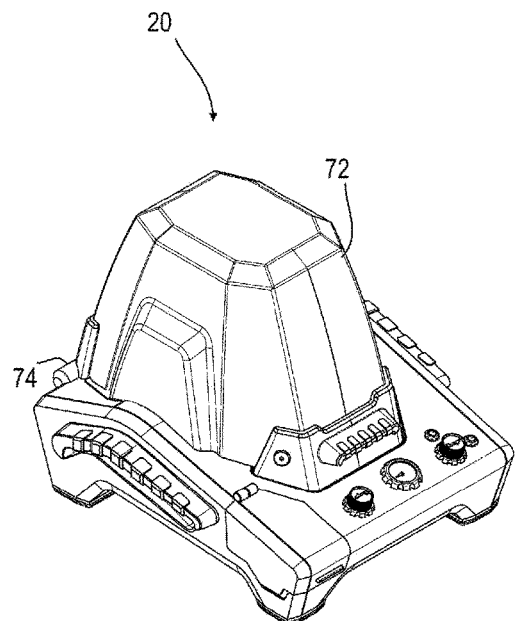
FIG. 2 shows the device of FIG. 1 from another angle.

The housing 46 of this example comprising a safety cover 72 attached to the base 66. The safety cover providing a safety shield to operators, other personnel and equipment should the gas fitting 28 or electromagnet 42 fail. These potentially creating a projectile hazard which will impact the safety cover 72 before cause damage external thereof. In the example shown, the safety cover 72 is attached to the base 66 at a hinge or cover pivot 74. In FIG. 2 all systems are off, and the device is ready to use.

Figure 3:
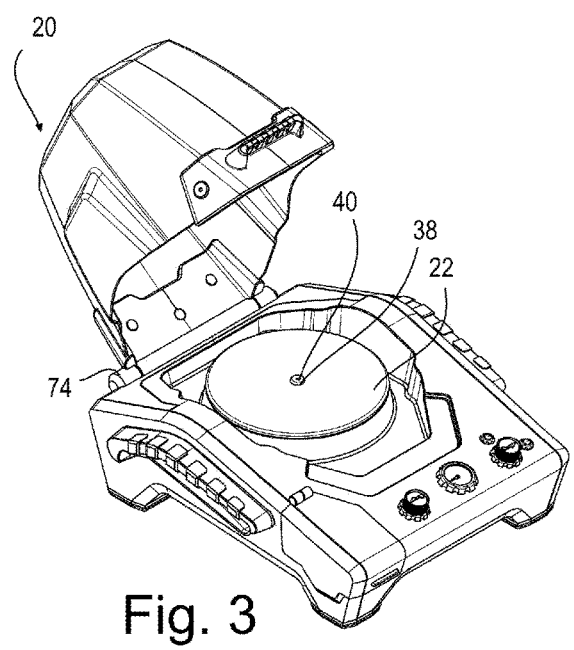
FIG. 3 shows the device of FIG. 2 with a safety cover opened to receive a gas fitting.

In FIG. 3 the safety cover 72 is shown opened to allow the operator access to the test plate 22 to remove or place the gas fitting 28.

Figure 4:
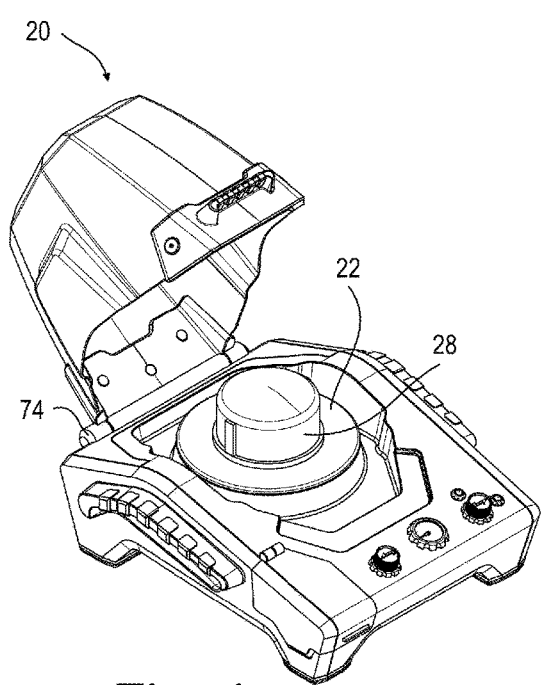
FIG. 4 shows the device of FIG. 3 with the gas fitting in place on the test plate.

In FIG. 4, a gas fitting 28 has been placed on the test plate 22 over the opening 40 and sealed to the test plate 22 as previously discussed.

Figure 5:
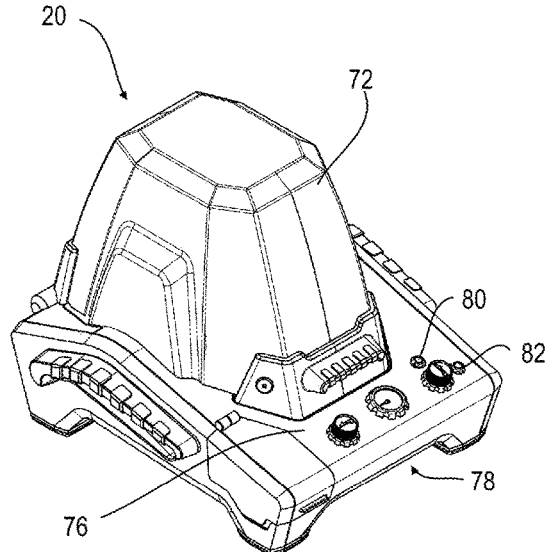
FIG. 5 shows the device of FIG. 4 with the safety cover repositioned to protect the users and nearby personnel/equipment.

In FIG. 5 the safety cover 72 is closed and optionally latched. In addition, controls on the control panel 76 are manipulated to operate the test device 20. For example, a magnet power control switch 78 may be manipulated to engage the electromagnet 42, thus biasing the gas fitting 28 towards the test plate 22 and thus seal the gas fitting 28 to the test plate 22. This action may turn off a magnet off indicator 80 and/or turn on a magnet on indicator 82.

A connector cap 86 may be removed from the fitting 52 and the fitting 50 attached thereto. This connecting the gas pressure source 44 to the opening 40. Once the electromagnet 42 is engaged, the valve actuator 84 is manipulated, thus opening the valve 54. In addition, if needed the air pressure source 44 is actuated such as by turning on the compressor or pump or opening a valve on the air cannister. This providing pressure to the gas fitting 22.

The pressure in the void 32 is measured and displayed at a pressure gauge 88. If the pressure as measured at the pressure sensor 92 reduces below a threshold limit in a specific time span, the test may be repeated. If it is determined there is a defect in the gas fitting 22 resulting in the pressure loss, the gas fitting 22 may be discarded or repaired.

Figure 7:
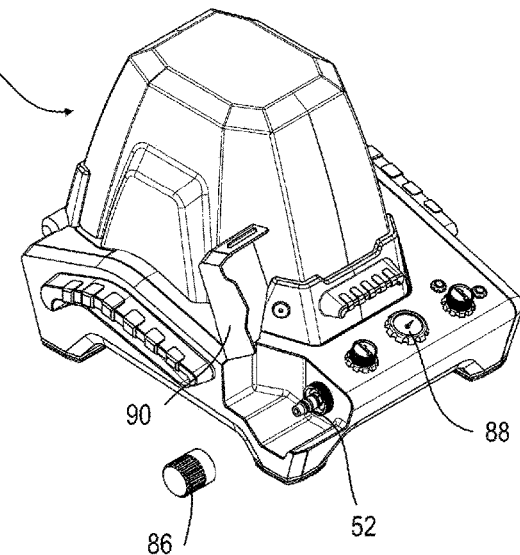
FIG. 7 shows the device of FIG. 4 with the gas conduit removed to allow attachment of a gas cap.
Figure 8:
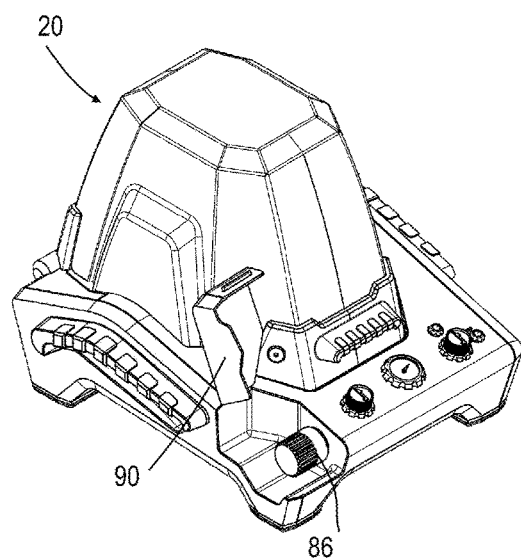
FIG. 8 shows the device of FIG. 2 with the gas cap attached.
Figure 9:
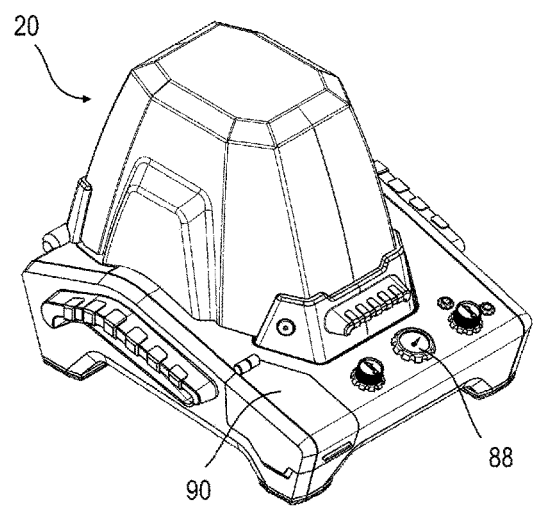
FIG. 9 shows the device of FIG. 2 during a testing cycle.

In one example, as shown in FIG. 7, once the valve 54 is closed, the conduit 48 may be removed and the apparatus left in this pressurized state. The fitting cap 86 may be replaced on the fitting 52. The fitting door cover 90 closed as shown in FIG. 9.

The operator may repeat these steps in reverse order, to depressurize the system, and shut the device 20 off. Once the device 20 is fully shut down, the operator may open the protective cover and remove the cap which has now been tested.

Data from the pressure cycle may be stored and uploaded automatically as disclosed below.

The test device 20 may use a printed circuit board (PCB) 94 to operate the electronic components, save data, control a timing circuit, etc. During and/or after testing, the test device 20 may record data such as beginning pressure, time interval of test, volume of gas pumped into the void 38, final pressure, etc. on a data recording PCB.

This recorded data may be transmitted via light or sound indicator indicating a positive, negative, or inconclusive test. In addition, or alternatively, this data may be output via Bluetooth chip 98, USB port 100, or other data conduits to an external data device such as a smart phone, tablet, computer, cloud storage, etc.

Data from each cycle of the machine is created stored and automatically uploaded to an off-site database. Data log entry includes time and date of test, duration of test, pressure of test, temperature of environment as measured at a temperature sensor 102.

Data may be uploaded from machine via Bluetooth to an operator's mobile device, then uploaded to off-site data base via cell network using a mobile app. Data can be manually extracted from machine using USB port 100 in one example located at the back of the machine.

While the present invention is illustrated by description of several embodiments and while the illustrative embodiments are described in detail, it is not the intention of the applicant to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicant's general concept. The invention illustratively disclosed herein suitably may be practiced in the absence of any element which is not specifically disclosed herein.

The invention claimed is:

1. A gas fitting pressure test device comprising:
   a test plate having a first side configured to seal to a gas fitting; the gas fitting having a surface defining a void therein;
   the test plate having a second side opposing the first side;
   a gas conduit through the first side of the test plate, the gas conduit configured to be in fluid communication with the void of the gas fitting;
   an electromagnet adjacent the second side of the test plate;
   the electromagnet configured to provide magnetic force on the gas fitting greater than the force exerted on the gas fitting; and
   a source of positive gas pressure in fluid communication with the gas conduit.

2. The gas fitting pressure test device as recited in claim 1, the test plate further comprising a malleable pad on the first side of the test plate.

3. The gas fitting pressure test device as recited in claim 1, further comprising a gas valve between the source of positive pressure and the test plate.

4. The gas fitting pressure test device as recited in claim 1, wherein the gas fitting is ferrous.

5. The gas fitting pressure test device as recited in claim 4, wherein the gas fitting is steel.

6. The gas fitting pressure test device as recited in claim 4, wherein the gas fitting is configured to be welded onto a gas pipe.

7. The gas fitting pressure test device as recited in claim 1, wherein the first side of the test plate is substantially planar.

8. The gas fitting pressure test device as recited in claim 1, wherein the first side of the test plate comprises a malleable layer configured to decrease pressure leakage from the void of the gas fitting.

9. The gas fitting pressure test device as recited in claim 1, wherein the gas fitting is a gas fitting termination cap.

* * * * *